INVENTOR
Erhard Mühlberg

Oct. 21, 1969 E. MUHLBERG 3,473,520
METHOD FOR BURNING FUEL IN A DIESEL ENGINE
Filed Dec. 15, 1967 3 Sheets-Sheet 3

INVENTOR
*Erhard Mühlberg*

BY *Stephens, Huettig and O'Connell*
ATTORNEYS

United States Patent Office 3,473,520
Patented Oct. 21, 1969

3,473,520
METHOD OF BURNING FUEL IN A DIESEL ENGINE
Erhard Muhlberg, Nuremberg, Germany, assignor to Maschinenfabrik Augsburg-Nurnberg, Aktiengesellschaft, Nuremberg, Germany
Filed Dec. 15, 1967, Ser. No. 690,911
Claims priority, application Germany, Dec. 16, 1966, M 72,050
Int. Cl. F02b *3/00;* F02m *39/00*
U.S. Cl. 123—32                                    4 Claims

ABSTRACT OF THE DISCLOSURE

The relative amounts of wall-deposited and air-distributed fuel in a M-system diesel engine is controlled as a function of the temperature of the engine and/or the exhaust gases. For cold starting, most, if not all, of the fuel is air distributed in the air swirl in the engine cylinder. Adjustment of the relative fuel proportions is accomplished by altering the direction of the fuel jet and/or by changing the fuel jet pattern and/or by altering the air swirl. This method combines the good cold-start and low-load performance of the conventional diesel engine with excellent full-load performance of the advanced M-system engine.

---

This invention is directed to a method for injecting fuel and forming a fuel-air mixture in an internal combustion engine of the compression-ignition type. This engine has a piston in a cylinder, a cylinder head and a combustion chamber communicating with the cylinder and provision for an air swirl about the longitudinal axis of the cylinder. Part of the fuel is deposited on the wall of the combustion chamber and vaporized by the heat of the combustion chamber wall and the other part of the fuel is injected into the air swirl for direct mixing. In this invention, the ratio of the amount of fuel deposited on the combustion chamber wall to the fuel directly injected into the air swirl is changeable.

This invention combines the advantages of the conventional diesel engine in which the fuel is directly atomized in the combustion chamber air, while avoiding its disadvantages, with the advanced compression ignition engine disclosed in the U.S. patent to Meurer et al., No. 2,907,308, and in which the major portion of the fuel is injected as a thin film on the wall of the combustion chamber and then vaporized and mixed with the air swirl in the chamber and then burned. This method, known as the M combustion system, depends for its advanced performance on relatively high temperature of the combustion chamber wall (which may not be available during starting from cold or in part-load operation).

An internal combustion engine operating according to the method of this invention has the good low-load performance of the conventional diesel engine in that, while the temperature of the combustion chamber wall is too low for satisfactory fuel vaporization, deposition of liquid fuel is minimized, with the result that the fuel is better utilized and the exhaust gases are cleaner, not only when starting the engine, but also when the engine is idling or operated in its low-load range, as well as during engine warm-up.

To such well-known advantages of the conventional engine are added those of the M-method, namely, as compared to conventional fuel injection, improved combustion efficiency in the upper engine load range with the result that a cleaner exhaust is obtained, especially with regard to soot content, carbon monoxide, hydrocarbons and nitric acid emissions, a higher output at the smoke limit, and a better fuel utilization. Additionally, the M-method produces a lower noise level which results from controlled combustion, and lower thermal and mechanical stress levels which, especially in the upper load range of the engine, is of great significance for the stability and engine life and reduces the rate of oil deterioration during engine operation.

By means of the method of this invention, which has for its basic and novel object the control of the ratio of the amount of fuel deposited as a thin film on the combustion chamber wall to the amount of fuel directly injected into the cylinder air, it is especially possible to completely prevent or at least greatly prevent the following disadvantages of the conventional diesel engine fuel injection:

(a) ignition knock and associated higher thermal and mechanical stresses;
(b) a comparatively high content in the exhaust gases of soot, carbon monoxide, hydrocarbons and nitric acid, as well as a low fuel utilization in the upper load range of the engine as the result of increasingly poorer combustion efficiency;
(c) comparatively low engine utilization, that is, a lower output at the smoke limit as a result of the increasing amount of combustible matter that fails to burn during the combustion process.

Also, the following disadvantages of the M-method are either eliminated or substantially reduced:

(d) cold starting difficulties;
(e) poor exhaust gas quality by the emission of eye, nose and lung irritants, such as aldehydes, acroleins, hydrocarbons, organic acids, and including acetic and formic acids, and carbon monoxide and hydrocarbons formed during cold starting, warm-up, idling and in the low-load range of the engine;
(f) high fuel comsumption in the low-load range;
(g) liability of sticking exhaust values because of pitch-like deposits on the valve stems caused by the exhaust gases;
(h) increase in the wear and tear and shorter lubricating oil life in engines operating in the low-load range, as, for example, garbage and trash trucks, because of the poor exhaust gas quality as listed under (e), supra.

The above-listed disadvantages of the M-method start from the same cause, namely the fact that the temperature of the combustion chamber wall on which the fuel is deposited as a thin film is too low for a sufficiently rapid fuel vaporization under the above operating conditions.

The above information was obtained from extensive comparative tests made on modern engines using substantially the conventional diesel process and engines using the M-method.

The problem of eliminating their relative disadvantages has been solved by the method of this invention in that the fuel injection is altered by changing the direction of the fuel jets and/or the fuel atomizing setting of the nozzle above a predetermined combustion chamber wall temperature which corresponds to that normally obtained under steady-state operating conditions in the medium load range. The basic principle in this invention is to apply an increasing proportion of fuel by film-wise deposition as the wall temperature increases. Below this predetermined temperature and in the measure as the wall temperature decreases as a result of reduced output and/or the outside cooling of the engine, film-wise deposition of the fuel is superceded steadily or in graduated phases by the conventional method atomizing the fuel directly in the cylinder chamber air. This relative application of either system is such that the disadvantages which would strongly increase if the M-method were retained 100% as the temperature drops are either completely or to a great extent eliminated. However, the relationship between the two methods of fuel injection is chosen so that the running roughness associated with combustion knock in the conventional diesel engine has hardly any practical effect.

Instead of using the combustion chamber wall temperature as the controlling variable, it is possible to use all those measured variables which, during engine operating conditions, are directly or at least approximately proportional to the combustion wall temperature. Such are preferably the temperatures of all engine parts touched by the combustion gases, such as the bottom of the cylinder head and the valve bridges, the injector nozzle parts adjacent the combustion chamber and the wall of the exhaust port or pipe.

However, the temperature of the exhaust gas itself can be used as the controlling variable.

The relative use of these two different fuel injection methods which can be controlled manually or automatically guarantees optimum performance under all operating conditions including cold starting, warm-up, and varying ambient air temperatures because control of this ratio is derived from variables which are closely related to the cause of the M-method disadvantages, namely, a low combustion chamber wall temperature.

Full optimization under this invention is indicated for all operations where a clean exhaust gas is an important factor, that is, in engines used in mining operations, subways, enclosed environments, as well as in vehicles used in dense traffic areas.

If it is not necessary to comply with such strict requirements with regard to the quality of the exhaust gases, then instead of the relative control of these two methods of fuel injection being derived from the above representative temperatures, control can be derived from the engine performance or rather operational factors definitely related to it, such as the fuel consumed per unit of time. It is then, of course, impossible to obtain full optimization during cold starting and during warm-up, as well as during widely varying ambient temperatures which, of course, also influence the temperature of the combustion chamber wall.

This is true where, in a further simplification of control, the relative use of either fuel injection concept is varied as a function of the load (output torque) or rather operational variables proportional thereto, such as the amount of fuel injected per cycle (position of the control element controlling the amount of injected fuel). This control alternative is inferior to that heretofore described inasmuch as during operation under conditions of constant load but changing engine speed, the ratio of the effective proportions of the two fuel injection methods is not changed even though, as a result of changing the engine speed, the output and thereby the combustion chamber wall temperature is either reduced or increased depending upon whether the engine speed change is minus or plus. Compared to control based on power output, conditions during cold starting and warm-up of the engine are also liable to be impaired in the latter case.

In the present state of the art, it is noted that there has been no lack of experiments to try to eliminate and/or reduce the disadvantages of the M-method. However, as compared to the method of this invention, the results have been only incompletely achieved or penalized by still other significant disadvantages.

It may be possible to reduce the disadvantages inherent in the M-method by means of a compromise solution, such as restricting the portion of the fuel which is injected onto the combustion chamber wall by fixed alternative settings of the fuel jet orientation position of the injected fuel jet which, however, cannot be changed during the time when the engine is running.

The means by which the objects of the invention are obtained are described more fully with reference to the accompanying schematic drawings in which:

FIGURES 1–1c are graphs showing the relative content of CO (FIG. 1), the relative content of hydrocarbons (FIG. 1a), the relative fuel economy (FIG. 1b), and absolute exhaust smoke according to the M.A.N. scale (FIG. 1c), plotted against the output of the engine for various fuel jet orientations, viz.

curve a is for the position of the fuel jet according to the M-method;

curve b is for the fuel jets rotated 40° from the M-method to enhance the air-distributed proportion of the fuel;

curve c is for the fuel jet rotated 80° from the M-method to further enhance the air-distributed proportion of the fuel;

curve d is for a variable positioning of the fuel jet as proposed under the method of this invention;

Figure 2:
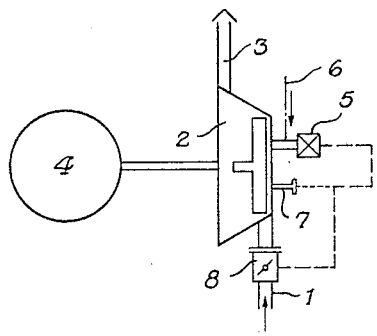
FIGURE 2 is a schematic view of a system for the automatic variation of the position of the fuel jet.
Figure 3:
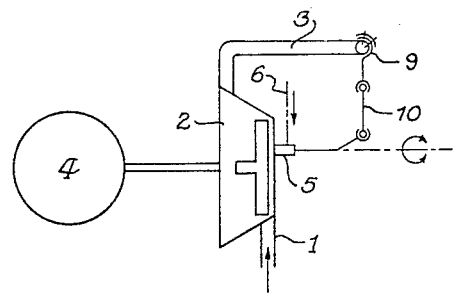
FIGURE 3 is a modification of the system shown in FIGURE 2.
Figure 4:
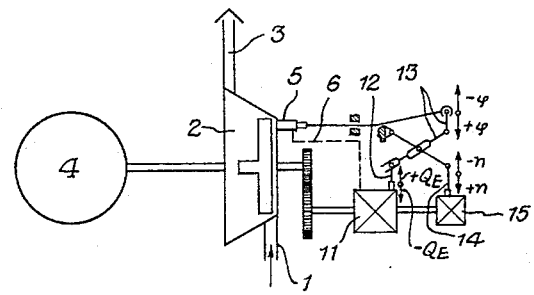
FIGURE 4 is a schematic representation for the variation of the position of the fuel jet as a function of engine output.

As shown in FIGURES 2 to 4, the control system has an air intake pipe 1 for the diesel engine 2 and an exhaust pipe 3. The engine is coupled to an electric generator or load 4. An adjustable fuel injection nozzle 5 is mounted in the fuel injection line 6. A temperature sensing device 7 is mounted in a suitable position in the cylinder head and through which the nozzle 6 is adjustable in the cylinder head. A mechanism 8 for disrupting or destroying the air swirl in the cylinder is mounted in the intake pipe 1. A bimetallic strip 9 is mounted on the exhaust pipe 3 and actuates a lever 10 for changing the position of the nozzle 5. A fuel injection pump 11 driven by gears schematically shown has a control rod 12 joined to a scissors-like linkage 13 for rotating nozzle 5, the linkage being at the same time connected to a tachometer generator 15.

Figure 1:
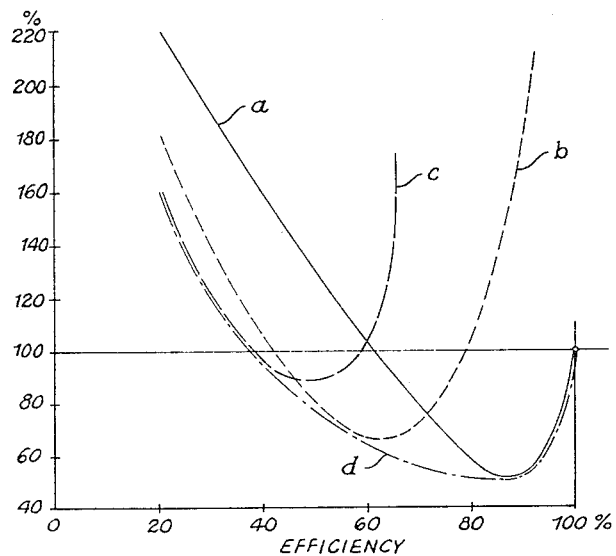
Figure 1A:
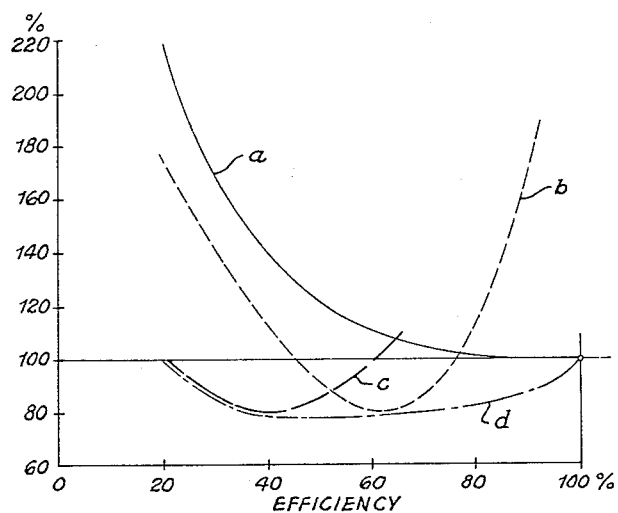
Figure 1B:
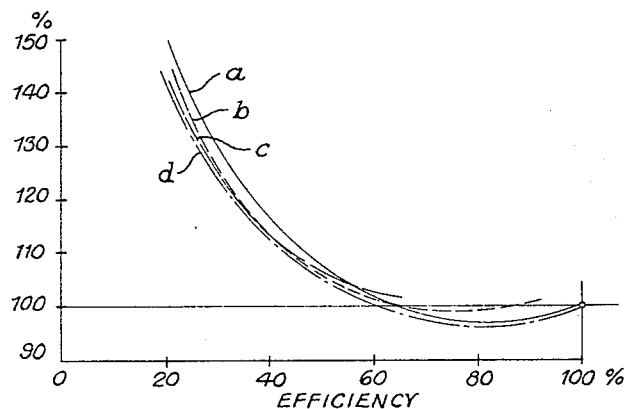
Figure 1C:
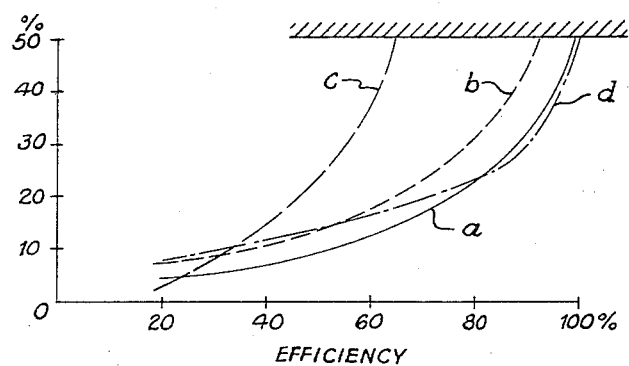

FIGURE 1 and subordinate FIGURES 1a–1c show, for a diesel engine operating under the M-method, the advantages of this invention. Note for example the rotation of the position of the fuel jet by 40° from the full M-method position as indicated by curves b in FIGURES 1–1c. These curves show how the obvious reduction of the gas contents for carbon monoxide, hydrocarbons and an improvement in fuel efficiency in the low-load range are all penalized by a deterioration of the exhaust gas quality, as well as the economy in the high-load range. Because of the comparatively higher soot content in the exhaust gases (smoke) in the high-load range, there is an added penalty in the form of a considerable loss in maximum output which in naturally aspirated engines is set by the permissible soot content (smoke limit).

However, as shown by the curves d, these disadvantages are avoided by the method of this invention providing for the relative use made of both fuel injection concepts being variable over a wide range during the running of the engine, an added advantage being in the possibility of considerably improving performance in the low-load range with regard to the quality of the exhaust gas and fuel consumption.

In the present example, steady variation of the ratio of the two different fuel injection concepts is accomplished as the output and, consequently, the combustion chamber wall temperature are decreased by progressively changing the position of the fuel jet issuing from a special injection nozzle having one orifice during the operation of the engine from the full M-method position until in the lowest low-load range a position is attained where as much of the fuel is directly injected into the air as is possible without producing rough running of the engine.

A compromise solution has a disadvantage with regard to the position of the fuel jet if any attempt to avoid the M-method disadvantage is made by raising the compression ratio without changing the position or direction of the M-method fuel jet. It is beset with similar penalties as the compromise solution referred to with a fixed alternative fuel jet position setting. The improvement in exhaust gas quality which is achieved is not comparable with the instant method and secondly must be again paid for with a poor exhaust gas quality in the high-load range of the engine and a loss of output as, for example, 15%, as well as an increase in fuel consumption because of the increase in friction and pumping losses. A further disadvantage is because of the increasing of the compression ratio, as, for example, from $\Sigma=17$ to $\Sigma=23$, the maximum or peak combustion pressure and thus the mechanical and thermal stressing of the engine become greater, as well as the difficulty of keeping adequate seals.

A similar unsatisfactory situation results when the position of the fuel jet or jets as well as the compression ratio are changed in the sense of a restriction of the M-method effect without provision being made to vary the setting during engine operation.

Also, it has been proposed to improve with the aid of a rotating nozzle the unfavorable cold starting behavior of the engine operating under the M-method in that, during engine starting, this rotatable nozzle is adjusted so that the fuel can be injected with a maximum free trajectory, and/or by injecting the fuel counter to the direction of the combustion air swirl and distributed as best as possible in a still liquid form into the air as in the conventional fuel injection.

In view of the limitation of the above proposal to the starting phase and the abrupt change in the direction of fuel injection, that is, without any graduated transition, the latter proposal is not comparable with the method of this invention which covers all operational conditions of the engine and constitutes a novel solution and advanced technical art.

The elements of this invention are not anticipated in an arrangement where the change-over from conventional fuel injection during engine starting is accomplished, instead of rotating the entire injection nozzle, by keeping the nozzle in its initial position and then either changing the direction of the air swirl in the combustion chamber or, in extreme cases, reversing the air swirl so that it flows counter to the direction of the fuel jet. In this case, a masked intake valve has been used which can be rotated around the axis of its stem for changing the air swirl. This is done during the intake stroke with the mask covering a portion of the valve head circumference.

Nor is the fuel injection method of this invention anticipated when, in a M-method engine and for the purpose of reducing pressure losses during the intake air stroke, the change in air swirl is produced by means of a tailored intake pipe for altering the air swirl or increasing the turbulence of the air in the cylinder or even reversing the air swirl for the purpose of injecting the fuel into the air in the conventional manner. The flow of the intake air into the combustion chamber is effectively accomplished by a so-called swirl destroyer which originally was only used for improving the cold starting conditions for ignition and combustion in a M-method engine. This swirl destroyer essentially consists of a plurality of rotatable guide blades in the form of a semi-circle with the number of blades corresponding to the number of cylinders or intake ducts or consists of indented adjustable throttles mounted in front of the individual air intake ports of the cylinders for the purpose of influencing the air flow.

In a simpler but not as effective manner, it is possible to influence the air flow in the combustion chamber by means of a butterfly damper in the air intake manifold of the engine for changing the swirling intensity of the air in the combustion chamber as well as the turbulence as is known in the prior art.

Finally, in order to complete the prior art, it has been proposed to use a special fuel injection nozzle having a needle stroke controllable by the r.p.m. of the engine for changing the M-method injection toward the conventional injection method not only during starting, but also during idling and low engine speed. This change is accomplished by changing the shape of the injected fuel jet, namely, from a solid jet having a small conical angle and with little atomizing effect in the air to a jet having a large conical angle so that the fuel is finely atomized as it is injected into the air. This method is restricted to the starting and low speed running of the engine and is not comparable to the method of this invention which covers all engine operating conditions and exceeds the operational limits of the previous proposals.

Compared to this invention, and even the simplified forms of the same, where the combination ratio of the different fuel injection methods is controlled as a function of the exhaust gas temperature and/or the temperature of the exhaust pipe, the latter system involves substantial disadvantages.

Thus, because of the change-over to the alternate injection methods being limited to the low-load range, there will be no departure from the M-method towards the conventional fuel injection method, at low-load operation in the medium and high speed range although, because of the associated relatively low combustion chamber wall temperature, under these conditions, the disadvantages of the M-method are liable to affect performance.

Incorrect matching of injection systems would occur in the conventional methods when the engine operates at low speed and at high load which is liable to be the case during travel in the mountains. In a manner which does not only greatly impair output, fuel consumption, and exhaust gas emissions, but also in a manner which endangers the engine, as by thermal overload, these conventional methods would by reason of the low engine speeds tend to employ the conventional injection concept under these conditions whereas, since the combustion chamber temperature is sufficiently high, the M-system is excellently suited to cope with these conditions.

As compared to the method of this invention, extremely unfavorable conditions occur with conventional methods during engine warm-up if such occurs with moderate hill climbing under load with an engine that has cooled following a down drive in a mountainous area or when standing still. With the often correct assumption that this moderate climb can be in low gear with the engine at high speed, the fuel would in the conventional method be injected according to the M-method for which the temperature of the combustion chamber wall would be too low for good combustion. This is even more so in the initial phases of the warm-up period. Mismatching of this type is not possible with the method of this invention which varies the combination ratio of the injection concepts as a direct or indirect function of the temperature of the combustion chamber wall (as the controlling parameter) making use of all graduations between 100% conventional and 100% M-method.

The restriction of the means with which the change in the type of fuel injection is supposed to be accomplished also as a disadvantageous effect in the prior art. According to the known method, the change-over is to be accomplished only with the assistance of the change in the character of the jet of injected fuel which results, in many cases, as in the case of the small combustion chamber size of high speed engines, where the free fuel trajectory length is necessarily small and thus allows insufficient scope for the change towards fuel distribution in the air as in the conventional fuel injection method. As contrasted thereto, the method of this invention for achieving optimum conditions at all times is deliberately not restricted in the means that can be employed for adjusting the ratio of the two fuel injection methods, so as to match the combination correctly to the prevailing operating conditions. In addition to a special rotatable injection nozzle or preferably a nozzle with internal provision to vary the jet position, such as adjusting the needle in the nozzle, this invention permits the use of other means for changing the pattern of the jet or the direction or intensity of the air swirl and/or the turbulence in the cylinder for achieving the objects of this invention.

A further development of this invention, in order to prevent a deterioration of the quality of the exhaust emission which is mainly the soot formed in high performance engines, that is engines which, using the M-system, make full use of the smoke limit rating, is in that either manual or automatic provision is made for the amount of injected fuel under full load to be reduced if the operating conditions, such as full load in the initial stage of the warm-up period, at which time the temperature of the combustion chamber wall is not high enough for the M-method, the M-system has to be phased out in favor of conventional fuel injection which inherently produces more soot in the exhaust gases. This additional feature allows for the fact that as the injection method departs from the M-method at full-load operation the susceptibility of soot formation relative to the M-method tends to increase substantially.

Because of this graduated relationship, this invention further proposes to control the so-called full-load stop on the fuel injection pump for these engines as a function of variables which characterize the ratio of the effective parts of the fuel injection methods in the combination employed, for example, the position of the injected fuel jet and/or the position of the swirl destroyer. In this case, the fuel injected per cycle is reduced in the measure as the component of the conventional fuel injection method is increased. Accordingly, the reduction in the amount of injected fuel for full load is the greatest at the moment when the operating condition requires that an already cooled-off engine must operate under full load. In this case, the reduction of the full load, aside from the advantage of preventing excessive soot formation and other deterioration of the exhaust gas quality, involving an abnormally high CO content, hydrocarbons and nitric oxides, brings additionally the advantage that the engine is not subject to excessive heat stresses.

This invention also applies when the gradually changing ratio of the conventional method and M-method is not only used in diesel engines which have heretofore been operating according to the M-method, but also in engines already having a type of a compromise solution with regard to the fuel injection method, that is, if they already permit a sufficient portion of the fuel to be spread on the combustion chamber wall. It is clear that such engines having a compromise fuel injection method which cannot be changed during operation cannot compete with the successful performance of the engine according to the method of this invention. The performance of such engines is comparable approximately with curve $b$ with the jets rotated 40° from the M-method jets. This means also that improvements in the low-load range are offset with deterioration in the high-load range.

This substantial disadvantgae of such engines is eliminated by the method of this invention because, by use of available means and starting with the operating condition where the compromise engine reaches optimum performance, the M-method component is progressively increased as the combustion chamber wall temperature increases and that, in reverse, progressively greater use is made of the conventional fuel injection method as the temperature of the combustion chamber wall decreases.

In an engine having a combustion chamber in the piston with the combustion air rotating around the axis of the chamber and having an injection nozzle with a plurality of orifices located in the range of the axis of the chamber, such as being centrally located with the fuel jets directed radially outward and slightly downward, by using a special injection nozzle having a variable degree of fuel atomization, less fuel is atomized and more and more fuel is deposited on the combustion chamber wall starting from an operating point in the medium-load range. Consequently, the M-method advantages become more pronounced in the high-load range and increasingly predominant. Inversely, the M-method disadvantages in the low-load range are more and more lessened as the combustion chamber wall temperature decreases and with more of the fuel injected according to the conventional method.

In this type of engine, it is also possible to increase the desired results in the sense of the method of this invention by altering the air flow within the combustion chamber by available means.

The method of this invention can be similarly successfully used in another type of engine which also has an air swirl around the cylinder axis. In this type of engine, the fuel is injected through two orifices in the fuel nozzle in such way that about 50% of the fuel is injected approximately vertical to the rotational plane of the air, that is along the longitudinal combustion chamber side wall and thus necessarily has some effects of the M-method while the conventional fuel mixture component is predominant with the remaining fuel injected with a second nozzle orifice. The latter fuel is supposed to penetrate into the circumference of the hot air core by means of a guide component extending in the direction of the air rotation.

The method of this invention can be realized very easily in such engine. Again starting with the optimum operating point of the engine lying approximately in the medium-load range and with an increase in output along with an increased wall temperature, either the fuel portion being injected through the second nozzle orifice is more and more reduced or the position and/or degree of atomization of the second fuel jet is correspondingly varied in the sense of more fuel being deposited on the wall.

When the output is reduced, consequently the temperature of the wall is lowered and the procedure is reversed. The fuel injected through the second orifice in the nozzle into the air is increased at the cost of the amount of fuel injected through the first nozzle orifice. Alternatively, the position of the fuel jet coming from the first orifice can be changed and/or its degree of atomization is increased in the sense of increasing the air-distributed fuel proportion.

There is again the possibility of enhancing the effects of this invention by additionally altering the air flow in the combustion chamber.

Several examples of the characteristics of the method of this invention follow. However, this invention is not restricted to these particular examples. In order to produce optimum performance operating conditions throughout the entire working range of the engine and particularly in view of the prevalent air pollution by vehicle exhaust emissions, the method of this invention is intended to offer a combination of the relative merits of the two fuel injection methods for diesel engines, namely the conventional method and the M-method which can be for engines of different types without suffering from a compromise restricting its successful application.

As schematically shown in FIGURE 2, the diesel engine 2 coupled to a load such as an electric generator 4 has an automatically operated control apparatus fulfilling the method of this invention for changing the position and, if need be, the degree of atomization of the fuel jet. In addition, there is a swirl destroyer 8 which alters the flow of air in the combustion chamber and which is composed of individual dampers arranged directly in front of each air intake port in the intake pipe 1. The injection nozzle 5 joined to the fuel line 6 connected to the not shown injection pump, as well as the swirl destroyer 8, is controlled dependent upon the thermostat 7 functioning as sensing element and located at a suitable point on the cylinder head having a temperature directly proportional to the combustion chamber wall temperature or with available means for measuring this temperature without contact with the wall.

The control of the parts to be adjusted, such as the injection nozzle and swirl destroyer according to this invention is accomplished not as a direct function of said temperature, but is accomplished together or separately for each range in such a manner that within a certain temperature range, no control action is transmitted.

In certain applications, it may suffice to use a simple "on-off" control in such a way that, if the temperature falls below a predetermined value, the injection nozzle is displaced from the M-method jet position into a position which ensures a higher portion of the fuel air distribution with perhaps a simultaneous increase in atomizing effect and if, at the same time or even at different temperature limit, the swirl destroyer is displaced in an analogous sense.

The control apparatus has in addition to the thermostat device 7 and the positioning elements 5 and 8 a conventional actuating mechanism which operates mechanically, hydraulically, pneumatically, electrically or thermally and which for reasons of simplicity has not been shown in FIGURE 2.

FIGURE 3 schematically shows an actuating mechanism in a very simple form. The intake pipe 1 is joined to the diesel engine 2 which has an exhaust pipe 3 and which is coupled to a load 4. The adjustable injection nozzle 5 joined to the injection line 6 is also shown. If the position of the fuel jets can be easily adjusted, it is possible to use, without amplification, the controlling impulse coming from bimetallic strip 9 mounted on a portion of the exhaust pipe circumference at a distance from the engine and at a point having a permissible temperature level and a suitable control lag.

In this invention, the control of the fuel injection, as in this example, is derived from a variable which again varies in a defined relationship with the combustion chamber wall temperature, namely, dependent upon the temperature of the exhaust gas pipe 3. This is influenced exactly as the combustion chamber wall temperature, by the load, the revolutions per minute, and the ambient air temperature. The lower the said values are, the lower will be the exhaust pipe temperature. Because of this and by reason of this invention, the position of the jet from nozzle 5 is changed in the sense of an increased injection into and atomizing of the fuel in the air by way of the lever system 10 and under a slight displacement of the bimetallic strip 9 which is mounted on exhaust pipe 3 with one end clamped to it.

The selection of a temperature suitable for the proper functioning of the bimetallic strip, as well as an appropriate control lag can also be achieved by the thickness and/or type of material used at this point in the exhaust pipe, aside from the previously mentioned predetermined distance between the engine and the point of the attachment of the bimetallic strip on the exhaust pipe.

The temperature level can also be influenced at this point by a change, effected by available means, in the heat transferred from the section of the exhaust gas pipe which lies in advance of it to the surrounding air by means of radiation and convection.

A final example is a control apparatus in which the ratio of the fuel injected into the combustion air to that injected onto the combustion chamber wall is only decisively enlarged, and indeed quite suddenly, with on/off control, when the exhaust gas temperature falls below a preset level, and this is accomplished by means of an available adjusting mechanism which is operated electromagnetically and also available is a thermal switch whose temperature sensitive portion is submerged in the exhaust gas stream. This is a very simple apparatus. Despite the fact that it will not be able to completely adjust to optimum relationships, in many practical cases, it will be quite sufficient.

When dealing with a diesel engine of the type described on col. 15 line 26, et seq., of this specification in which, in the low-load range and during starting as well as during the beginning of warm-up and because of the relatively thick film of fuel spread on the combustion chamber wall, disadvantages of the M-method occur to a considerable extent, then the ability to influence the ratio of the fuel injected in the air to the fuel injected onto the wall by means of a change in the spray pattern of the injected fuel is deemed suitable, because this ratio can be influenced only insignificantly in this type of engine by changing the jet orientation because of the plural orifice injection nozzle being positioned on or close to the centerline within the range of the axis of the combustion chamber.

Of course, even this example has again the possibility to use the swirl destroyer or a butterfly damper in the intake manifold to incerase the effect which the method of this invention strives for by influencing flow conditions in the combustion chamber.

In FIGURE 4, the output which is the product of the engine load and r.p.m. is used as the controlling variable for changing the ratio of the fuel injected into the air to that injected onto the wall. This is accomplished by adjusting the fuel jet angle $\varphi$ and/or the jet pattern of the special injection nozzle 5 not only as a function of the r.p.m. but simultaneously as a function of the injected fuel amount $Q_E$ which is substantially proportional to the load. The control rod 12, which determines the amount of fuel delivery, of injection pump 11 which supplies the special injection nozzle 5 with fuel by way of line 6, as well as the adjusting rod 14a of the tachometer generator or speed sensing element 15, whose position is proportional to the engine speed, is directed for this purpose to the scissor-like adjusting member 13 for the special injection nozzle 5, as clearly shown in FIGURE 4. This adjusting mechanism is suitable for the setting of a positioning element depending upon two control variables as is known. In FIGURE 4, the direction of the minus arrows, $-\varphi$, $-n$, signifies the adjustment of injection nozzle 5 in the sense of an increase in the air-distributed fuel proportion and the direction of the plus arrows, $+\varphi$, $+n$, an adjustment of the injection nozzle in the sense of an increase of the amount of fuel deposited on the combustion chamber wall.

The above-described control mechanism operates purely mechanically. If it is necessary, available elements to amplify these control signals can be added. Of course, the control can be accomplished electrically, hydraulically and pneumatically or in a combination of the same. The control signal can also be derived from an available dynamometer or torque sensing element in connection with a speed sensing element.

Finally, it is emphasized that the method of this invention is not limited to direct injection diesel engines, but also covers diesel engines having a divided combustion chamber.

Having now described the means by which the objects of this invention are obtained.

I claim:

1. A method for the fuel injection and the formation of an air-fuel mixture in an internal combustion engine of the diesel type and having a cylinder, a cylinder head, a piston in said cylinder, a combustion chamber wall in communication with said cylinder, means for producing a unidirectional air swirl around the longitudinal axis of said cylinder, and fuel nozzle means for injecting portions of the fuel onto said wall and directly into said air swirl, the improvement comprising means for controlling said fuel nozzle means for varying the ratio of fuel injected on said wall to fuel injected into said air swirl constantly over the entire operating range of said engine so that above a certain temperature of said wall as measured by an equivalent value such as the engine temperature, the exhaust gas temperature or the engine output, the fuel is injected onto said wall, and below said temperature the amount of fuel injected into said air swirl and mixed with air is increased in such a way that the irritating components in the exhaust gas such as aldehyde, acrolein, carbon monoxide and hydrocarbons are substantially eliminated, fuel consumption is reduced, and hard running of the engine due to uncontrolled combustion is substantially entirely prevented.

2. A method as in claim 1, further comprising altering the air swirl in the cylinder by means of a masked valve or dampers to vary the proportion of the fuel directly injected into the air swirl to the fuel injected onto said wall.

3. A method as in claim 2, further comprising, during cold engine starting, controlling the fuel injection pump as well as said nozzle means to inject substantially all of the fuel directly into said air swirl for preventing excessive smoke in the exhaust gases.

4. A method as in claim 3, further comprising controlling the ratio of the fuel directly injected into said air swirl to the fuel injected onto said wall during engine warm-up as determined by the optimum engine efficiency.

References Cited

UNITED STATES PATENTS

| 2,435,902 | 2/1948 | Reggio | 123—140.3 |
| 2,837,067 | 6/1958 | Meurer | 123—32 |
| 2,842,106 | 7/1958 | Meurer | 123—32.7 |

FOREIGN PATENTS

| 540,001 | 7/1959 | Belgium. |

LAURENCE M. GOODRIDGE, Primary Examiner

U.S. Cl. X.R.

123—30